United States Patent
Lee

(10) Patent No.: US 7,923,061 B2
(45) Date of Patent: Apr. 12, 2011

(54) METHOD OF MANUFACTURING SAFETY CONES FROM RECYCLED MATERIALS

(76) Inventor: Chin-Tai Lee, Sioushuei Township, Changhua County (TW)

( * ) Notice: Subject to any disclaimer, the term of this patent is extended or adjusted under 35 U.S.C. 154(b) by 901 days.

(21) Appl. No.: 11/892,437

(22) Filed: Aug. 23, 2007

(65) Prior Publication Data
US 2009/0051072 A1  Feb. 26, 2009

(51) Int. Cl.
*B05D 5/00* (2006.01)
*B28B 3/00* (2006.01)

(52) U.S. Cl. ........ 427/157; 264/319; 264/911; 264/918; 264/921

(58) Field of Classification Search ............ 427/157
See application file for complete search history.

(56) References Cited

U.S. PATENT DOCUMENTS
3,949,701 A * 4/1976 Teixeira .............. 116/63 P
2006/0024453 A1 * 2/2006 Setser et al. ............. 428/2

FOREIGN PATENT DOCUMENTS
JP        08-222016    * 8/1996
* cited by examiner

*Primary Examiner* — James Lin
(74) *Attorney, Agent, or Firm* — Wang Law Firm; Li K. Wang

(57) ABSTRACT

A method of manufacturing safety cones from recycled materials is disclosed. Recycled materials are disposed into a molding machine, which turns them into safety cone molds. A dye containing plastic powders, solvent, and colors is coated on the surface of the safety cone mold, rendering a colored safety cone. Therefore, the production cost can be reduced, and the color can stay longer.

6 Claims, 4 Drawing Sheets

METHOD OF MANUFACTURING SAFETY CONES FROM RECYCLED MATERIALS

BACKGROUND OF THE INVENTION

1. Field of Invention

The invention relates to a method of manufacturing safety cones from recycled materials and, in particular, to a manufacturing method of first making a safety cone mold and then coloring it.

2. Related Art

The safety cone used for guidance and indication on the street is shown in FIGS. 3 and 4. The production of a safety cone is done by combining two structures. First, a cone body 9 and a mass ring 9 are first prepared. Since the cone body 9 has to be colorful, it is made of a plastic material added with a dye. It cannot be made with recycled materials to avoid a dull color. The mass ring 8 is simply used to increase the weight at its bottom. Therefore, it can be made using recycled materials. Once the cone body 9 and the mass ring 8 are fabricated, the mass ring 8 is combined to the bottom of the cone body 9, rendering a safety cone. Besides, the cone body 9 is often attached with a reflective sticker 7 to reflect external light.

However, the usual safety cone involves complicated and time-consuming processes. Color materials have to be prepared in advance. The material cost is expensive and it is impossible to achieve mass production. Moreover, the surface of the safety cone is likely to deteriorate with time. It thus cannot keep its original color.

SUMMARY OF THE INVENTION

An objective of the invention is to solve the above-mentioned problems by providing a method of manufacturing safety cones from recycle materials. Safety cone molds are mass produced from cheap recycled materials, followed by coating the desired color. This can effectively reduce the production cost.

Another objective of the invention is to apply a dye on the surface of the safety cone, so that the safety cone can keep its original color after long-time use.

By adding appropriate fluorescent or reflective powders into the dye, the safety cone coated with the color can reflect external light.

To achieve the above objectives, the invention includes the steps of: putting recycled materials into a molding machine that turns them into a safety cone mold; and coating a dye with plastic powders, solvent, and colors on the surface of the safety cone mold, thereby rendering a safety cone with colors.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

In a first embodiment of the invention, the method of manufacturing a safety cone from recycle materials includes the following steps.

Figure 1:
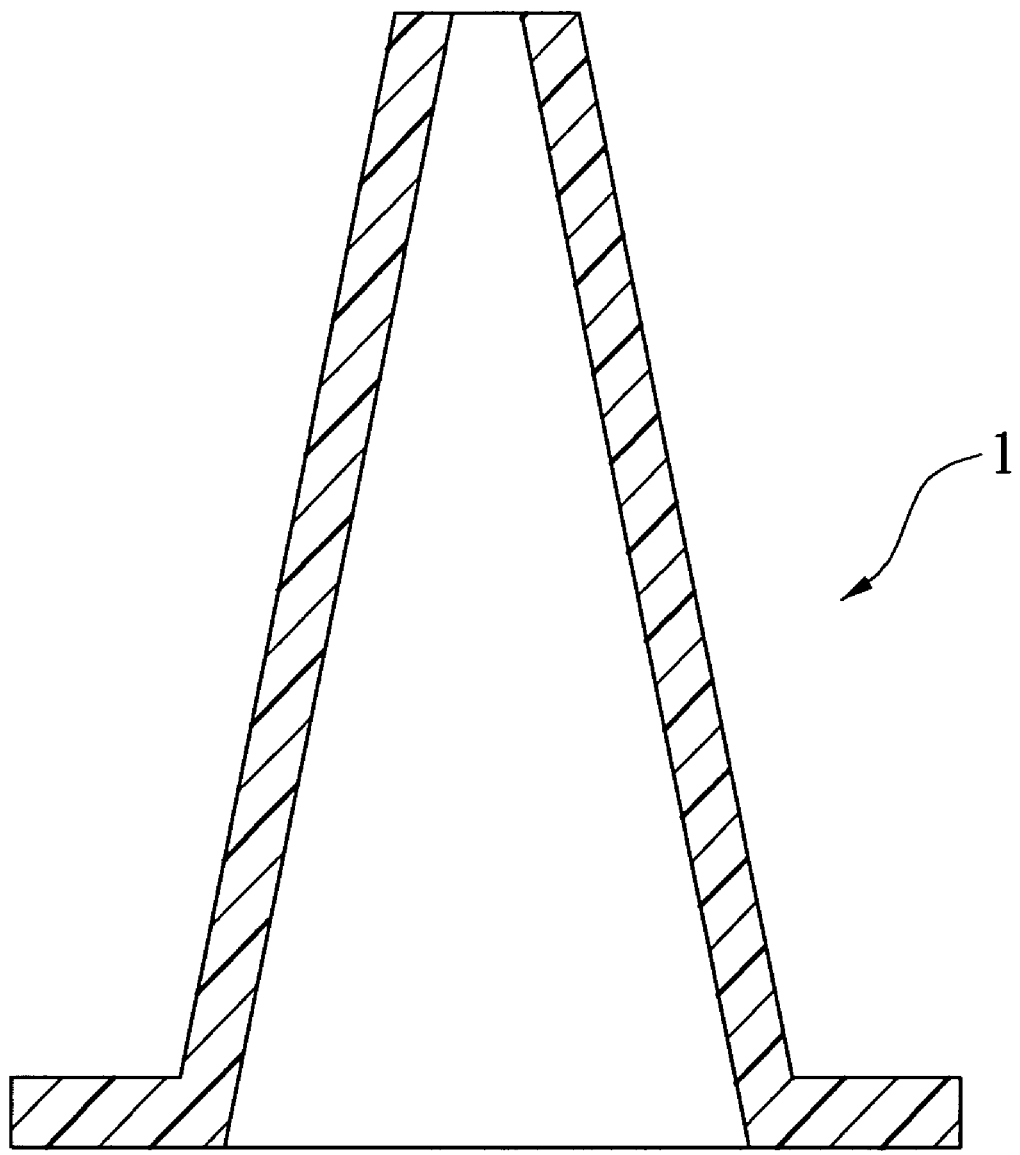
FIG. 1 is a cross-sectional view showing the structure of the disclosed safety cone.

First, the recycle materials are disposed in a molding machine. The molding machine turns the recycled material into an integrally formed safety cone mold 1, whose structure is shown in FIG. 1.

Figure 2:
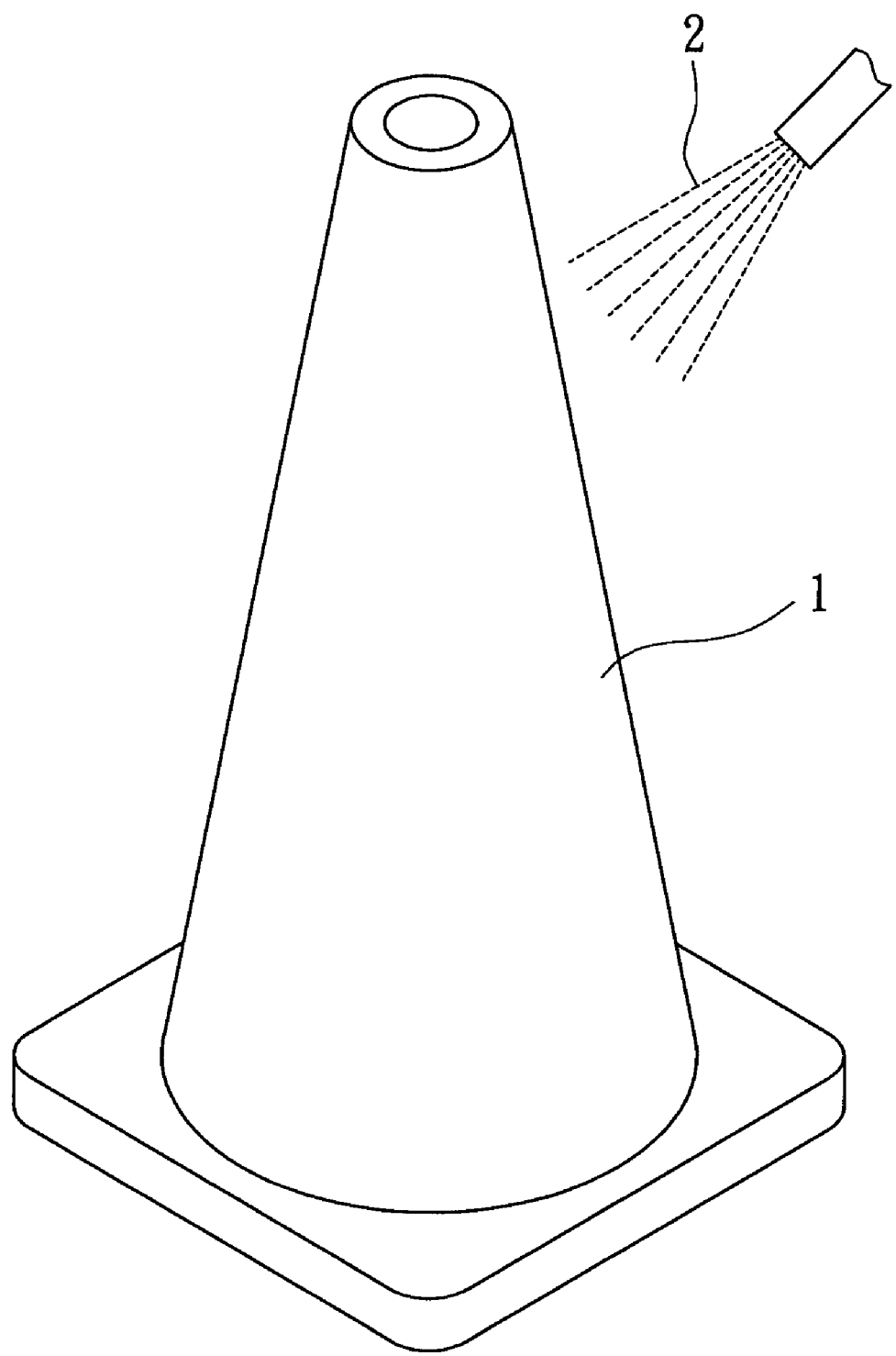
FIG. 2 is a schematic view coating a dye on the safety mold to obtain the desired color.
Figure 3:
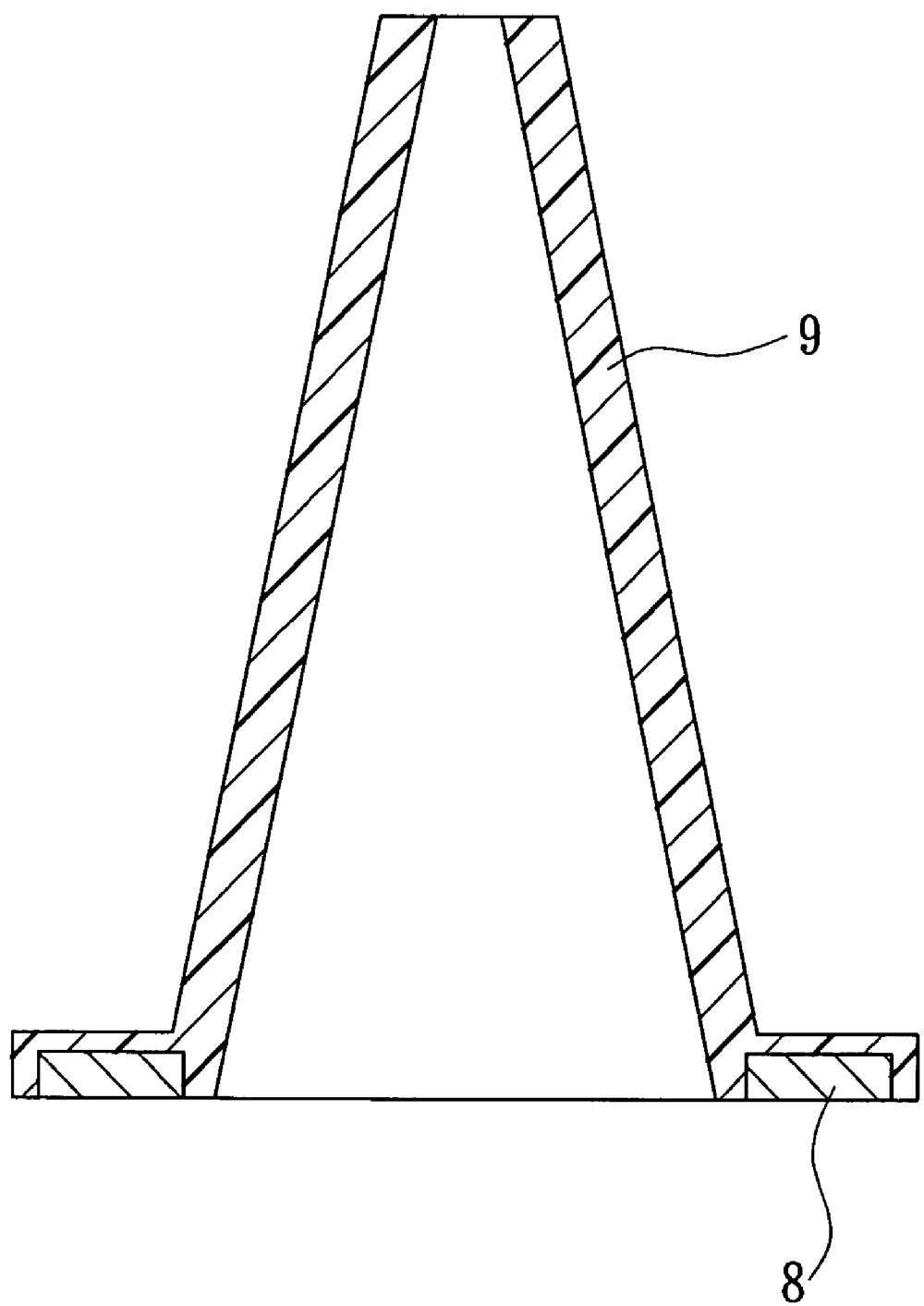
FIG. 3 is a cross-sectional view of the conventional safety cone, showing its mass ring structure.
Figure 4:
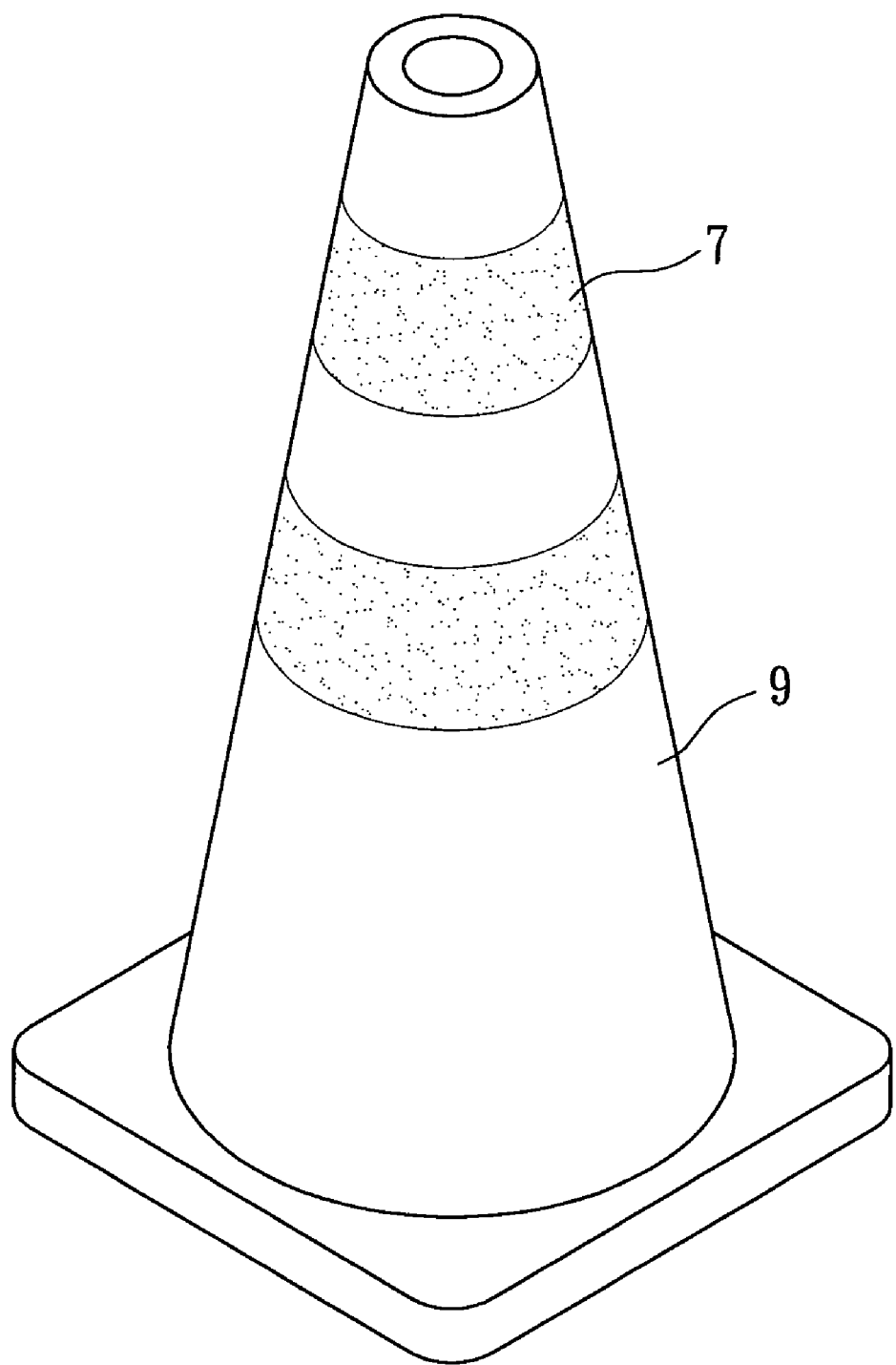
FIG. 4 is a schematic view of the conventional safety cone.

Afterwards, a dye 2 having plastic powders, solvent, and colors is coated on the surface of the safety cone mold 1, turning it into a colored safety cone as shown in FIG. 2. The dye 2 can be put on the surface of the safety cone mold 1 by spraying, coating, showering, or soaking.

In particular, the plastic powders and the recycled materials for the safety cone mold can be the same material for a better combination. Besides, the dye can be added with reflective powders and/or fluorescent materials in advance. In that case, the safety cone surface can reflect external light even without a reflective sticker.

In summary, the invention uses cheap recycled materials to mass produce safety cone molds. These molds are then coated with the colors demanded by the customers. Therefore, the production cost can be largely reduced due to the possibility of mass production.

Moreover, the dye is coated on the surface of the safety cone. Therefore, the safety cone is less likely to deteriorate. The color can stay for a longer time.

Furthermore, by adding appropriate fluorescent materials or reflective powders into the dye, the safety cone can effectively reflect external light.

Of course, the invention has other embodiments that are different from the one disclosed herein by some minor changes obvious to any person working in the field. For example, in a second embodiment, used and dirty safety cones are recycled and collected as the recycled materials. Such recycled safety cones can be directly coated with the above-mentioned dye. In this case, all the advantages in the first embodiment can be achieved. Moreover, the current embodiment can avoid the injection molding process for the safety cone.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of manufacturing a safety cone from recycled materials, comprising the steps of:
   disposing recycled materials inside a molding machine;
   making a safety cone mold with a surface using the molding machine and the recycled materials;
   coating the surface of the safety cone mold a dye having plastic powders, solvent, and colors on a surface of the safety cone mold, rendering a colored safety cone; and
   rendering a colored safety cone;
   wherein the plastic powders and the recycled materials are made of the same material.

2. The method of claim 1, wherein the dye contains reflective powders.

3. The method of claim 1, wherein the dye contains reflective materials.

4. A method of manufacturing a safety cone from recycled materials, comprising the steps of:
   recycling and collecting used safety cones;
   making the used safety cones into recycled materials;

coating a surface of a safety cone mold made with the recycled materials with a dye having plastic powders, solvent, and colors on a surface of the safety cone mold; and
rendering a colored safety cone;
wherein the plastic powders and the recycled materials are made of the same material.

5. The method of claim 4, wherein the dye contains reflective powders.

6. The method of claim 4, wherein the dye contains fluorescent materials.

* * * * *